(12) United States Patent
Payne et al.

(10) Patent No.: US 12,091,874 B2
(45) Date of Patent: Sep. 17, 2024

(54) PORTABLE AND VERSATILE TENT WITH BED

(71) Applicant: Circa Square, Calabasas, CA (US)

(72) Inventors: Dave Payne, Calabasas, CA (US); Michael Cecot-Sherer, Louisville, CO (US)

(73) Assignee: Circa Square, Calabasas, CA (US)

( * ) Notice: Subject to any disclaimer, the term of this patent is extended or adjusted under 35 U.S.C. 154(b) by 0 days.

(21) Appl. No.: 18/006,020

(22) PCT Filed: Sep. 3, 2020

(86) PCT No.: PCT/US2020/049196
§ 371 (c)(1),
(2) Date: Jan. 19, 2023

(87) PCT Pub. No.: WO2022/050945
PCT Pub. Date: Mar. 10, 2022

(65) Prior Publication Data
US 2023/0349189 A1  Nov. 2, 2023

(51) Int. Cl.
*E04H 15/06* (2006.01)
*B60P 3/34* (2006.01)
(Continued)

(52) U.S. Cl.
CPC ............... *E04H 15/06* (2013.01); *B60P 3/34* (2013.01); *B60P 3/341* (2013.01); *B60P 3/38* (2013.01);
(Continued)

(58) Field of Classification Search
CPC ....... E04H 15/06; E04H 15/324; E04H 15/54; E04H 15/64; E04H 15/44; E04H 15/56;
(Continued)

(56) References Cited

U.S. PATENT DOCUMENTS

| 2,835,313 A | 5/1958 | Dodge |
| 3,028,609 A | 4/1962 | Tolf |

(Continued)

FOREIGN PATENT DOCUMENTS

CA            2886590 A1 *  9/2015    ............. B60P 3/341

OTHER PUBLICATIONS

International Search and Written Opinion for International Application No. PCT/US2020/049196, dated Dec. 3, 2020, (16 pages), United States Patent and Trademark Office, US.

*Primary Examiner* — Robert Canfield
(74) *Attorney, Agent, or Firm* — Alston & Bird LLP

(57) ABSTRACT

A versatile and portable tent with bed having an inner tent, a framework for supporting the inner tent, a base for supporting the framework; and cushions positioned inside the base with the inner tent fastened to the base and the framework positioned inside sleeves of the inner tent. The base has two shells that can move between an open configuration and a closed configuration in which the inner tent, framework, and cushions, and any other tent component is completely housed inside the waterproof base cover. The tent is sufficiently lightweight that a single user can place the tent on the roof rack of a vehicle, in the bed of a truck, or on the ground. The tent can also be mounted on a platform to increase the versatility of the positioning or placement of the tent.

20 Claims, 14 Drawing Sheets

(51) Int. Cl.
*B60P 3/38* (2006.01)
*B60P 3/39* (2006.01)
*E04H 15/32* (2006.01)
*E04H 15/42* (2006.01)
*E04H 15/54* (2006.01)
*E04H 15/64* (2006.01)

(52) U.S. Cl.
CPC .............. *B60P 3/39* (2013.01); *E04H 15/324* (2013.01); *E04H 15/42* (2013.01); *E04H 15/54* (2013.01); *E04H 15/64* (2013.01); *Y10S 135/904* (2013.01)

(58) Field of Classification Search
CPC .... B60P 3/34; B60P 3/341; B60P 3/38; B60P 3/39; Y10S 135/904
USPC ................................. 135/88.07, 88.14, 904
See application file for complete search history.

(56) References Cited

U.S. PATENT DOCUMENTS

| | | | | |
|---|---|---|---|---|
| 3,712,316 A * | 1/1973 | Leonard | .................... | B60P 3/38 135/132 |
| 3,924,365 A * | 12/1975 | Orberg | ..................... | B60P 3/38 52/63 |
| 4,058,133 A * | 11/1977 | Barr | ........................ | B60P 3/38 135/132 |
| RE31,465 E * | 12/1983 | Robichaud | .............. | E04H 15/46 135/133 |
| 4,471,793 A * | 9/1984 | Cattaneo | .................. | B60P 3/38 135/904 |
| 4,521,048 A * | 6/1985 | Prvanoff | ................... | B60P 3/38 5/119 |
| 4,522,441 A * | 6/1985 | Allison | ..................... | B60P 3/38 135/88.17 |
| 4,830,036 A * | 5/1989 | Sanders | .................. | E04H 15/06 135/132 |
| 5,638,850 A | 6/1997 | Hazinski et al. | | |
| 5,669,182 A * | 9/1997 | Griffis | .................... | E04H 15/324 52/2.24 |
| 6,035,875 A * | 3/2000 | Chen | ........................ | E04H 15/06 135/88.07 |
| 6,167,898 B1 * | 1/2001 | Larga | ...................... | E04H 15/20 135/124 |
| 6,179,367 B1 * | 1/2001 | Bowen | .................... | E04H 15/20 135/124 |
| 8,789,548 B2 * | 7/2014 | Atherton | ............. | A01M 31/025 135/88.13 |
| 9,010,349 B1 * | 4/2015 | Heacock | ............... | E04H 15/324 5/418 |
| 9,580,928 B1 * | 2/2017 | Currid | ..................... | E04H 15/56 |
| 9,995,055 B1 * | 6/2018 | Currid | ..................... | E04H 15/06 |
| 10,753,120 B2 * | 8/2020 | Reeder | .................... | E04H 15/06 |
| 2004/0173251 A1 * | 9/2004 | Cantwell | ................. | E04H 15/32 135/115 |
| 2019/0352924 A1 * | 11/2019 | Currid | ...................... | B60P 3/38 |
| 2019/0376309 A1 * | 12/2019 | Montesalvo | .......... | E04H 15/324 |
| 2020/0180498 A1 * | 6/2020 | Jin | ........................... | E04H 15/48 |
| 2022/0017008 A1 * | 1/2022 | Davis | ...................... | B60P 3/341 |
| 2022/0243496 A1 * | 8/2022 | Zhou | ....................... | B60P 3/341 |
| 2022/0396967 A1 * | 12/2022 | Dunn | ........................ | B60P 3/38 |
| 2023/0132858 A1 * | 5/2023 | Pleasants | ................ | E04H 15/06 135/88.15 |
| 2023/0279691 A1 * | 9/2023 | Tsao | ........................ | E04H 15/10 135/88.13 |
| 2023/0279693 A1 * | 9/2023 | Wickramasekera | .... | E04H 15/30 135/143 |
| 2023/0349190 A1 * | 11/2023 | Ruzic | ..................... | E04H 15/48 |

* cited by examiner

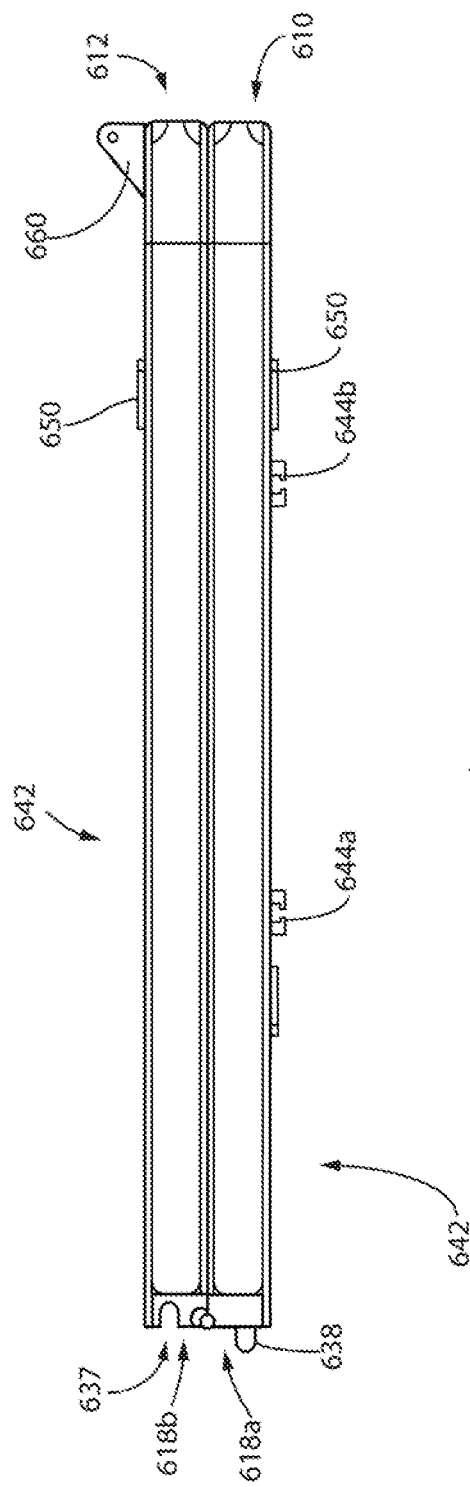

PORTABLE AND VERSATILE TENT WITH BED

CROSS REFERENCE TO RELATED APPLICATIONS

This application is a National Stage Application, filed under 35 U.S.C. § 371, of International Application No. PCT/US2020/049196, filed Sep. 3, 2020; the contents of which are hereby incorporated by reference in their entirety.

TECHNICAL FIELD

This invention relates to tents.

BACKGROUND

Current vehicle roof top tents are notoriously heavy (weighing about 100 pounds-250 pounds) due to built-in aluminum and steel base to support the tent. They generally require two to four people to lift it up and bolt it down to the vehicle roof top—where it stays mounted for the duration of a trip. Due to the excessive weight, roof top tents often times stay permanently mounted to vehicles, even when not camping, because they are too difficult to move and too large and heavy to store. So roof top tent owners are stuck with a vehicle with a roof top tent for daily driving. This has a negative impact on vehicle gas mileage as well as eliminates the ability to park inside a garage due to the increased vehicle height.

In addition, when camping in a traditional vehicle roof top tent, the camper is stuck camping on the vehicle. Once camp is set up, one cannot simply drive away from the campsite to explore. The tent on top of the vehicle has to be folded up (10-20 minute project) in order to do so. Because traditional roof top tents are bolted by the rigid base to the vehicle, the camper lacks the luxury of placing the comfortable tent anywhere at the campsite. Furthermore, many traditional roof top tents are dimensioned to extend off the side of the roof; and therefore, cannot be deployed in the bed of a truck, thereby further reducing its versatility.

Also, current roof top tents have a vinyl cover that zips around the tent when folded to protect the tent fabric from the harsh weather elements. When setting up the tent, this bulky cover is completely removed and set aside adding a layer of inefficiency when setting up the tent.

Furthermore, roof top tents contain a two to three-inch mattress and can only be set up on the roof of a vehicle using load bars or a roof rack. Therefore, these mattresses take up quite a bit of space during transport. Foam mattresses are too large and cumbersome to haul to a campsite for use, which is why the only foam mattresses at any campground exist only in trailers, recreational vehicles, and vehicle roof top tents and not in ground tents. Alternatively, an air mattress can be used. Air mattresses, however, are prone to leak and lose firmness during the night. In addition, air mattresses squeak, waking up others with every twist and turn. Also, air mattresses do not support larger adults or sore backs very well. Ground tent campers suffer the same problem of sleeping directly on the ground, or on air mattresses, but have not had the luxury of camping on the ground comfortably with a mattress (i.e. foam cushions and the like).

Another problem with roof top tents is that, if shipped to a customer, they have to be shipped via freight because of the large size and the weight. This is the most expensive shipping category. If a customer picks up a tent from a retail store, they would need a truck and additional help to move the product.

Most truck bed tents lack versatility as they are designed with a particular type of truck in mind, or a truck with certain features—those with dropgates, liftgates, camper tops, short beds, or long beds, etc. The tents either hook in or strap in to several locations around the truck. The initial set up may take some time, but is fairly simple after one or two attempts. Most truck bed campers choose to put a third party air mattress in the bed of the truck for a more comfortable experience. Without a mattress, a camper would be forced to sleep directly on the bed of the truck.

Finally, campers sleeping in ground tents lack a choice for sleeping in a tent up elevated off the ground. Some situations where moving the ground tent up high would be attractive are: when the ground is wet and muddy, when the views are better up high, when the ground is uneven or rocky, to stay clean up away from the dust and sand, and for safety from snakes and other animals.

For the foregoing reasons there is a need for a versatile, lightweight tent with bed mattress that can be easily stored and transported, and easily installed on the rooftop of a vehicle, in the bed of a truck, or on the ground.

DISCLOSURE OF INVENTION

The present invention is directed to a versatile tent applicable for use in all four seasons that can be set up for camping on the roof rack of a vehicle, in the bed of a pick-up truck, on the ground, and the like. In the preferred embodiment, the tent can contain a built in four-inch mattress, four doors/windows for views and ventilation, and weighs only about 30 pounds or less. The tent can be transported on any flat roof rack, load bars, factory rails, or even attached directly to a vehicle roof. For vehicle roof top camping, the tent can be mounted directly to any platform style roof rack (e.g., 1255 mm/85 inches or longer) by popular brands like Front Runner, Yakima and Rhino. The tent breaks down into two ground shippable boxes making it ideal for direct to customer business and for retailers to store inventory on-site.

The tent uses the platform of a roof rack and an extra firm mattress layer for support. As a result, bulky, heavy and expensive platforms used by traditional roof top tents have been eliminated making the tent of the present invention lightweight.

These features can be accomplished because the tent features a built in zippered shell that when open becomes the actual base and floor of the tent. The mattresses that can be easily assembled together. Due to the clamshell style base, foam mattresses are essentially built-in when the tent is pitched. The base is sewn to the inner tent and rainfly to facilitate water proofing while maintaining efficiency in pitching the tent. When closed, the entire tent is easily packaged so that the base becomes the outer cover for transportation on top of a vehicle. The tent is quickly and easily secured to a vehicle using the grommet tabs so that the tent can be mounted to a roof rack, using eye nuts, or to load bars and direct to roof using optional straps. The eye nuts and optional straps make the tent easily removable from the vehicle for pitching on the ground or in the bed of a truck, a trailer, and the like.

BRIEF DESCRIPTION OF DRAWINGS

FIG. 16 shows an elevation view of an embodiment of the platform in a folded configuration.

MODES FOR CARRYING OUT THE INVENTION

Figure 1:
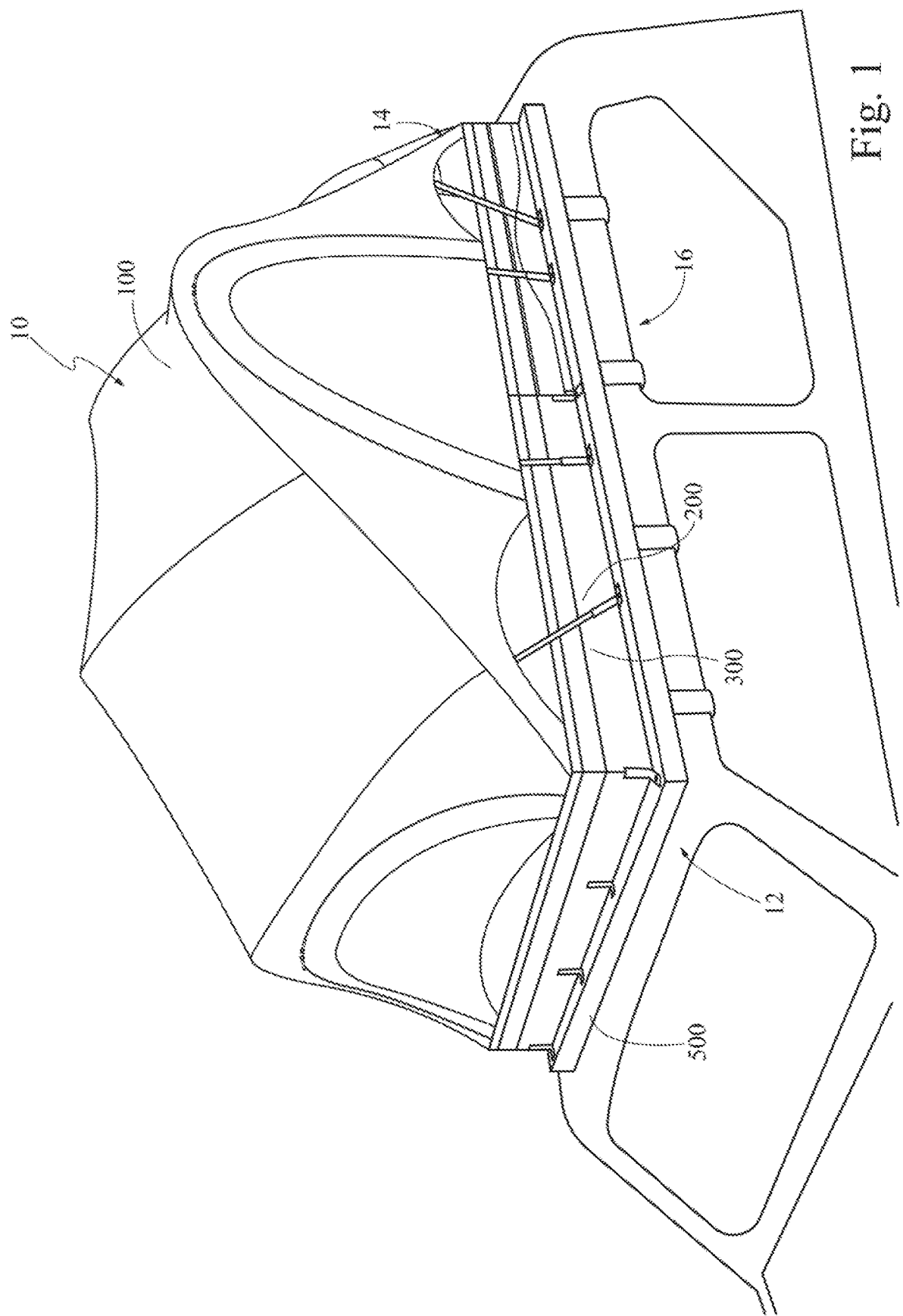
FIG. 1 shows a perspective view of an embodiment of the present invention mounted on a vehicle.
Figure 2:
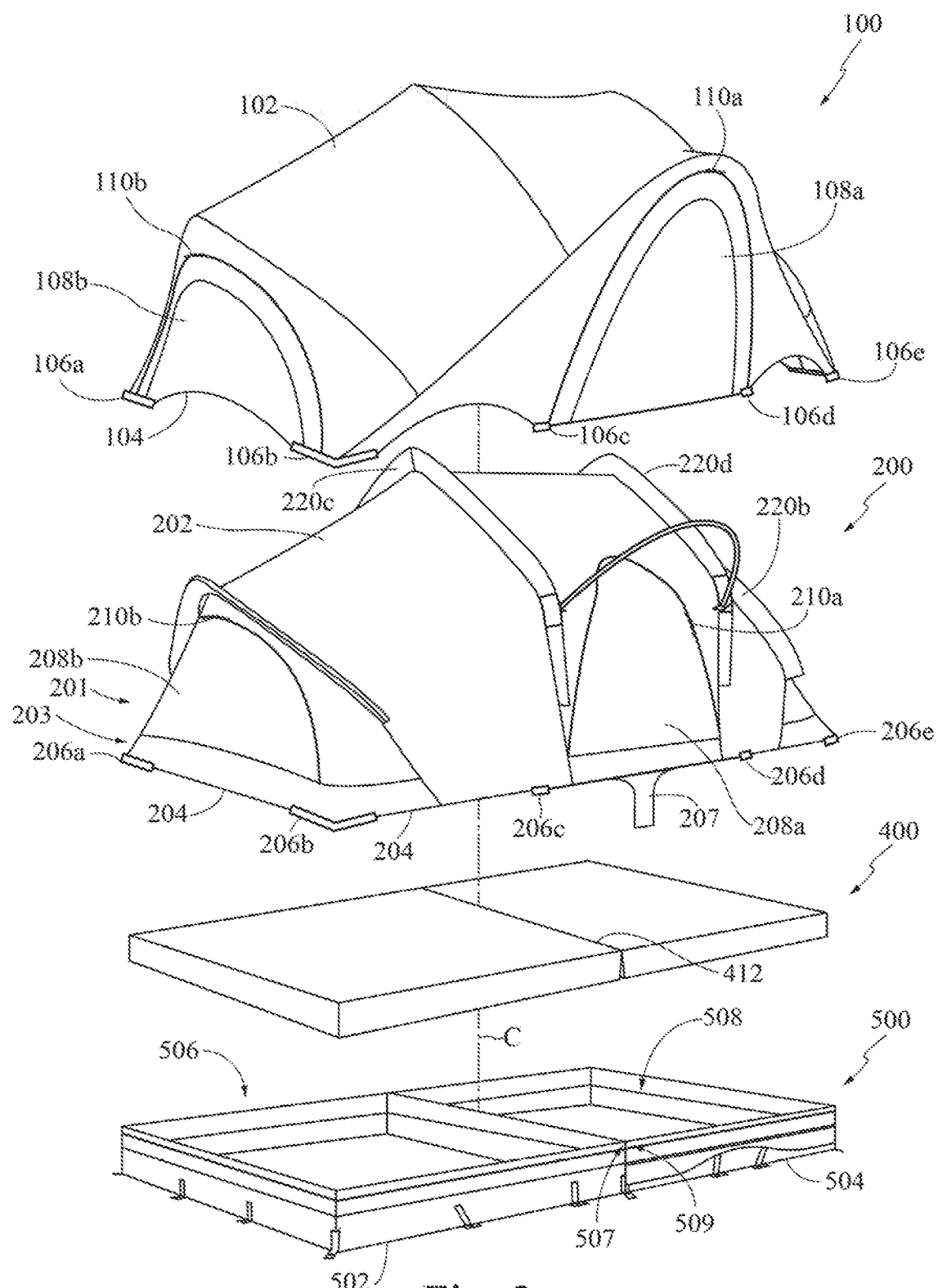
FIG. 2 shows an exploded view of the embodiment shown in FIG. 1.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

With reference to FIGS. 1-5, the invention of the present application is directed towards a versatile tent 10 that can be easily shipped, stored, transported, and deployed for use on top of the roof rack of a vehicle, in the bed of a pick-up truck, on the ground, and other like places, including trailers. The tent 10 comprises a rainfly 100, an inner tent 200 substantially covered by the rainfly 100, a framework 300 (see, FIG. 5) for providing support for the inner tent 200, cushions 400 configured to fit inside the inner tent 200, and a base 500 for supporting the framework 300 and receiving the cushions 400. In the preferred embodiment, as the tent 10 of the present invention is configured to be placed on the rooftop of a car or the bed of a truck, the overall shape of the tent 10 is rectangular having a length L1 as measured from a first side 12 to a second side 14, and a width W1 as measured from a front side 16 to a back side 18. As such, the tent 10 can be a tunnel tent, cabin tent, or any other tent having a rectangular base 500.

The rainfly 100 is typical of tent rainflies, and comprises a rainfly body 102 and a rainfly edge 104. The material is flexible so as to allow the rainfly body 102 to form a cavity underneath the rainfly body 102 so as to sit atop of the inner tent 200. In other words, the rainfly 100 is generally an outer shell that provides protection against wind and rain. As such, the rainfly 100 is preferably made from water resistant and/or wind resistant material. Preferably, the rainfly 100 can be made from polyester. Other materials can also be used with or instead of polyester, such as, nylon, polyvinyl chloride, canvas, vinyl, polyethylene, cotton, and the like, or any combination thereof. The rainfly 100 can also be treated with a coating to improve its water or wind resistance.

Unlike traditional rainflies, the present rainfly 100 comprises a plurality of fastening edges 106a-e. These fastening edges allow the rainfly to be attached to the inner tent 200. In the preferred embodiment, the rainfly 100 is permanently attached to the inner tent 200, meaning the rainfly 100 is not intended to be removed from the inner tent 200 without damage or additional tools. For example, the rainfly 100 can be permanently fastened to the inner tent at the fastening edges 106a-e using stitching, adhesives, and the like, or any combination thereof. In some embodiments, however, the rainfly 100 can be removably attached to the inner tent 200. For example, the fastening edges 106a-e can comprise zippers, hook-and-loop fasteners, buttons, clips, hooks, magnets, and the like, or any combination thereof, to securely fasten to the inner tent 200, but can also be removed without additional tools, and without damaging the tent 10. In some embodiments, the fastening edges 106a-e can be reinforced with additional material. Depending on the overall shape of the tent 100, the fastening edges 106a-e can be placed along the corners, or simply intermittently spaced apart at strategic locations to keep the rainfly 100 securely attached to the inner tent 200 without obstructing entryways. As the rainfly 100 is attached to the inner tent 200 at specific locations, a gap exists between the rainfly 100 and the inner tent 200

The rainfly 100 can further comprise rainfly flaps 108a-b that are connected to the rainfly body 102 with fasteners 110a-b, such as zippers, hook-and-loop fasteners, and the like, or any combination thereof, thereby creating an entryway, such as a door or window. The rainfly flaps 108a-b can be strategically placed around the rainfly body 102 to allow easy access to the inner tent 200. For example, the rainfly flaps 108a-b can be placed on the first and second sides 12, 14, and/or on the front and back sides 16, 18. By way of example only, larger rainfly flaps 108a can be placed on the front side 16 and/or the back side 18 to create doors, and smaller rainfly flaps 108b can be placed on the first side 12 and/or the second side 14 to create windows. Preferably, the front side 16 and back side 18 can have doors and the first side 12 and second side 14 can have windows. The rainfly could in some cases be completely removed to create a lighter 3 season tent.

The inner tent 200 forms the general living and sleeping space of the tent 10. Like the rainfly 100, the inner tent 200 comprises a tent body 202 and a tent edge 204. The material is flexible so as to allow the tent body 202 to form a cavity underneath the tent body 202 so as to create an open space to reside. As such, the inner tent 200 is preferably made from lightweight, breathable fabric, such as polyester. Other materials can also be used like the materials used to make the rainfly 100, but the inner tent 100 is generally not as heavy duty as the rainfly 100 because the rainfly 100 provides the protection against wind and rain.

Unlike traditional inner tents, the present inner tent 200 comprises a plurality of fastening edges 206a-e. These fastening edges 206a-e allow the inner tent 200 to be attached to the rainfly 200 at its fastening edges 106a-e. Also unlike traditional inner tents, the tent edge 204 of the present inner tent 200 is fastened to the base 500. Preferably, the entire tent edge 204 is fastened to the base 500. As discussed further below, in the preferred embodiment, the base 500 is a two-piece base made from two open shells 502, 504 having a box configuration with open tops 506, 508. The first and second shells 502, 504 are configured such that the first shell 502 and the second shell 504 are movable relative to each other to move between an open configuration in which the first shell 502 and the second shell 504 are laterally adjacent to each other (thereby doubling the length of a single shell), and a closed configuration in which the first shell 502 and the second shell 504 are stacked on each other (thereby doubling the thickness of a single shell). In light of the two-piece base, the inner tent 200 further comprises a tent edge tab 207. The tent edge tab 207 is positioned on the tent edge 204 where the first shell 502 meets the second shell 504. As such, the tent edge tab 207 extends from the tent edge 204 and can be bent parallel to the open tops 506, 508 and be fastened to the first shell 502 and the second shell 504, particularly along the adjacent corners 507, 509 of the base 500 where the two shells 502, 504 meet.

In the preferred embodiment, the inner tent 200 is permanently attached to the base 500, meaning the inner tent 200 is not intended to be easily removed from the base 500 without damage or additional tools. For example, the inner tent 200 can be permanently fastened to the base 500 along the tent edge 204 using stitching, adhesives, and the like, or any combination thereof. In some embodiments, however, the inner tent 200 can be removably attached to the base 500. For example, the tent edge 204 can comprise zippers, hook-and-loop fasteners, buttons, clips, hooks, magnets, and the like, or any combination thereof, to securely fasten to the base 500, but can also be removed without additional tools, and without damaging the tent 10. In some embodiments, the edge 204 can be reinforced with additional material.

In the preferred embodiment, the inner tent 200 comprises a tent upper body 201 and a tent lower body 203. The tent lower body 203 is a small strip that actually attaches to the base 500 as shown in FIG. 7C. As such, the tent lower body 203 is the portion of the inner tent 200 that defines the tent edge 204. The tent lower body 203 can be made of the same material as the rainfly 100. In some embodiments, the tent lower body 203 can be made of the same material as the tent upper body 201, but coated with water proofing formula. The tent upper body 201 is attached to the tent lower body 203 and makes up a majority of the inner tent 200. A tent fastener flap 209 can extend downwardly from the tent lower body 203 to cover a base fastener 530 on the base 500 when in the open configuration. In some embodiments, a connector fabric 205 can be used to connect the tent lower body 203 to the base 500. The connector fabric 205 can be made from any of the material suitable for the rainfly 100 or the inner tent 200. Preferably, the connector fabric 205 connects the inside of the tent lower body 203 to the inside of the base 500. The tent fastener flap 209 can be attached to the same location as the connector fabric 205 but hang on the outside of the base 500. This reduces the chances of water entering the inner tent 200. To further improve waterproofing a layer of raintly fabric 211 can be attached over the tent fastener flap 209. The layer of rainfly fabric 211 can be attached at the same location as the tent fastener flap 209, hang on the outside of the tent fastener flap 209, and in some embodiments, hang lower than the tent fastener flap 209 to allow water to drip off the sides and not into any nooks or crevices along the base. For example, the layer of rainfly fabric 211 can overlap onto the base fastener flap 531.

The inner tent 200 can further comprise tent flaps 208a-b that are connected to the tent body 202 with fasteners 210a-b, such as zippers, hook-and-loop fasteners, and the like, or any combination thereof, thereby creating an entryway, such as a door or window. The tent flaps 208a-b can be strategically placed around the tent body 202 to allow entry, exit, and airflow through the inner tent 200. For example, the tent flaps 208a-b, can be placed on the first side 12, the second side 14, the front side 16, and/or the back side 18, or any combination thereof. In the preferred embodiment, larger tent flaps 208a are placed on the front and back sides 16, 18 as doors, and smaller tent flaps 208b are placed on the first side 12 and the second side 14 as windows.

The inner tent 200 further comprises pole sleeves 220a-d. The pole sleeves 220a-d are strategically placed along the tent body 202 from a position near the tent edge 204 on the front side 16 of the tent body 202 to a position near the tent edge 204 on the back side 18 of the tent body 202. The pole sleeves 220a-d are open ended to allow poles 302, 304, 306, 308 to be slid in from one side and come out the other. When the poles 302, 304, 306, 308 are inserted through their respective sleeves 220a-d and secured to the base 500, the poles 302, 304, 306, 308 provide structure for the inner tent 200 giving the inner tent 200 its shape and creating the open space therein.

In the preferred embodiment, the sleeves 220a-d are arranged transversely from the front side 16 to the back side 18. Preferably, there are four sleeves, two end sleeves 220a, 220b and two middle sleeves 220c, 220d. The two end sleeves 220a, 220b are position near the first and second sides 12, 14 of the tent 10 and the two middle sleeves 220c, 220d are position nearer the centerline C of the tent 10 relative to the end sleeves 220a, 220b. Preferably, the sleeves 220a-d are made of jersey fabric; however, other types of durable material can be used.

Figure 3:
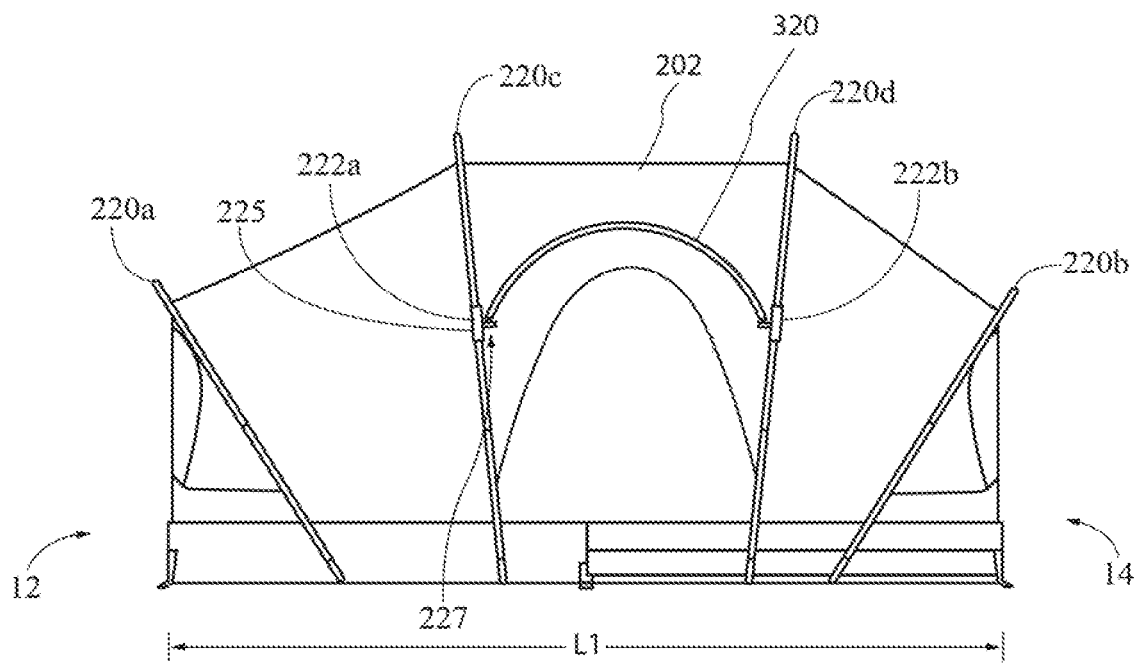
FIG. 3 shows a front elevation view of the embodiment shown in FIG. 1.
Figure 4:
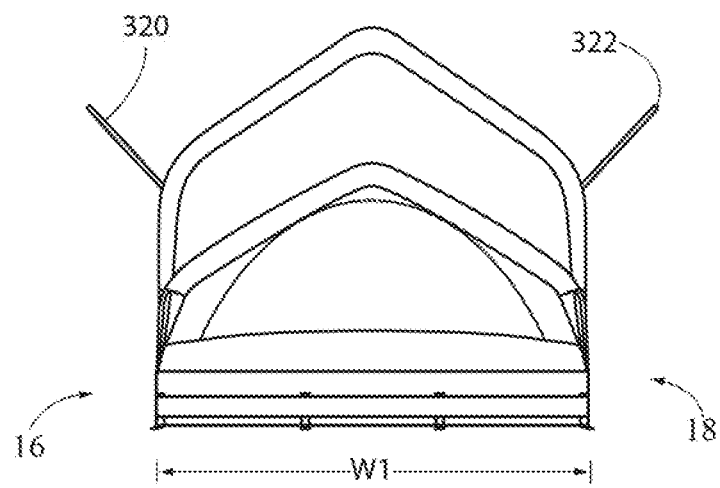
FIG. 4 shows a side elevation view of the embodiment shown in FIG. 1.

The inner tent 200 can further comprise auxiliary pole supports 222a-b. Auxiliary pole supports 222a-b can be used to support additional poles to further customize or enhance the look of the tent 10. In the preferred embodiment, the auxiliary pole supports 222a-b can be attached to the sleeves 220a-d. For example, in the preferred embodiment, the two middle pole sleeves 220c, 220d may straddle an entryway. Additional pole supports 222a, 222b may be attached to the two middle poles sleeves 220c, 220d adjacent the entryway as shown in FIG. 3. An auxiliary pole 320, such as a hoop pole, can be attached to the additional pole support 222a, 222b creating an arch above the entryway. With the rainfly 100 placed on top of the auxiliary pole 320 and additional covering is created above the entryway. A second auxiliary pole 322 can be positioned on the other side in the same manner. More auxiliary poles can be used to further enhance or customize the look of the tent 10 by reconfiguring the shape of the rainfly 100. In the preferred embodiment, the additional pole supports 222a-b can be made of the same or similar material as the sleeves 220a-d. Grommets can be placed into the additional pole support 222a-b to receive the ends of the hoop poles 320, 322. For example, in the preferred embodiment, the additional pole supports 222a-b can have an L-shaped configuration having a vertical portion 225 and a horizontal portion 227. The vertical portion 225 can be used to attach to the pole sleeve 220c-d, and the horizontal portion 227 can have a hole reinforced with a grommet to receive the ends of the auxiliary pole 320, 322.

Figure 5:
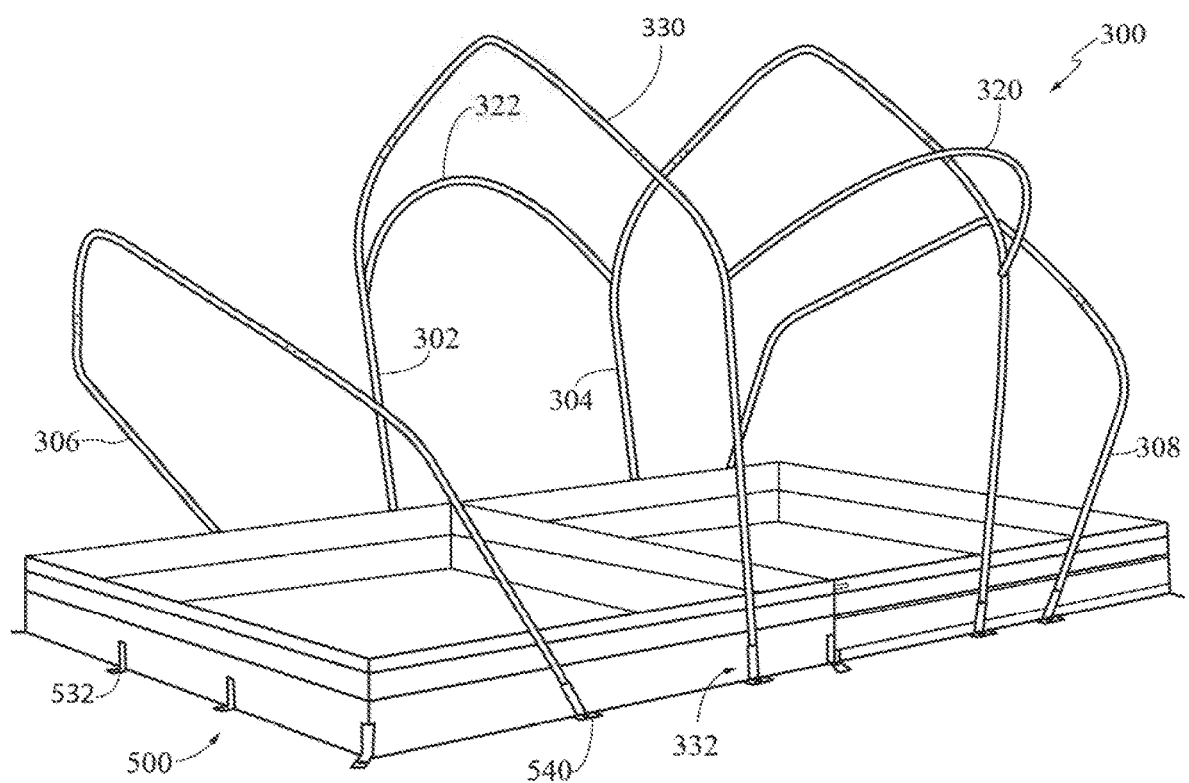
FIG. 5 shows a perspective view of the tent with the rainfly and inner tent removed to show the framework and base.
Figure 6A:
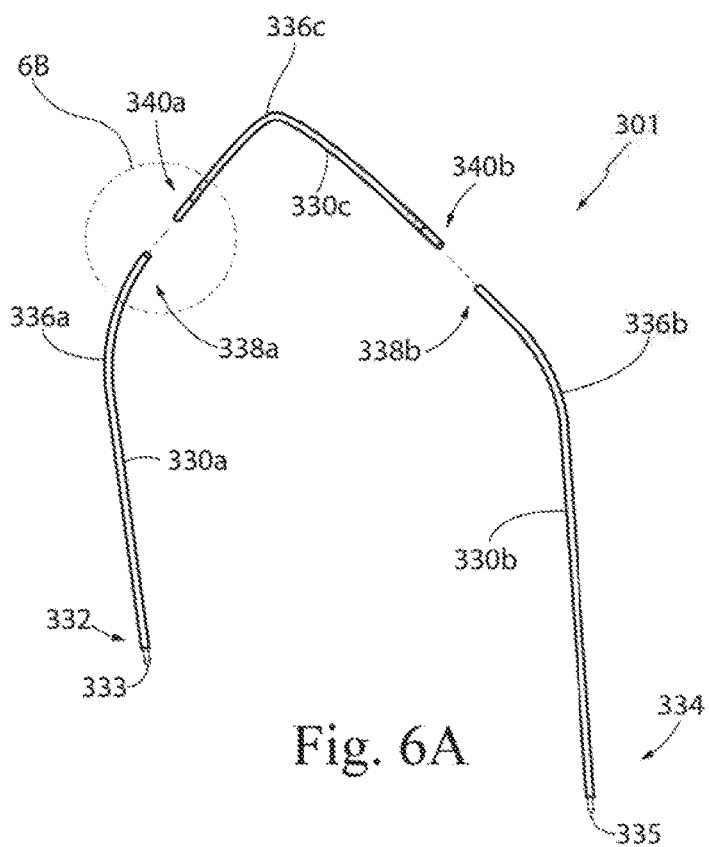
FIG. 6A shows an exploded view of a pole.
Figure 6B:
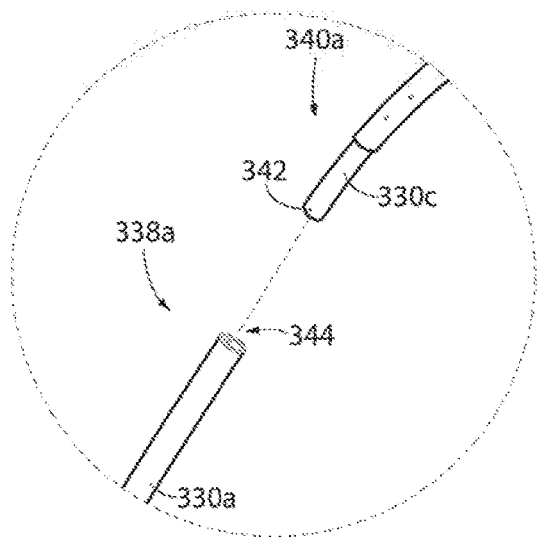
FIG. 6B shows a close up of the portion of FIG. 6A designated as 6B.

With reference to FIGS. 5-6B, the framework 300 comprises a plurality of main poles 302, 304, 306, 308 for supporting the inner tent 200. In some embodiments, auxiliary poles 320, 322 can be used to customize, enhance, or further modify the look of the tent 10. The main poles 302, 304, 306, 308 and auxiliary poles 320, 322 can be of a variety of shapes and sizes, but otherwise, have the same or similar features. As such, for ease of discussion and to minimize redundancy, a general pole 301 is described herein, the description of which is applicable to each of the main poles 302, 304, 306, 308 and the auxiliary pole 320, 322. The poles 301 are generally rigid structures, comprising a shaft 330 having two terminal ends 332, 334. The terminal ends 332, 334 can have pegs 333, 335 projecting therefrom for insertion into pole anchors 540 on the base 500. In some embodiments, the shaft 330 may be comprised of multiple shaft pieces 330a-c. The example shown in FIG. 6A is shown with three pieces, a first end piece 330a, a second end piece 330b, and a middle piece 330c therebetween. Providing the shaft 330 in multiple pieces facilitates storage. Preferably, each piece 330a-c has a prebend 336a-c formed into the shaft. The prebends 336a-c are curves already formed into the poles 301. As such, the poles 301 can be rigid and do not have to be bent into shape; however, flexible poles can also be used. Once the shaft pieces 330a-c are attached together, the inner tent 200 is formed. Each of the first and second end pieces 330a, 330b has one of the terminal ends 332, 334, and an attachment end 338a, 338b. The middle piece 330c has two attachment ends 340a, 340b. The terminal ends 332, 334 are configured to attach to the base 500, and the attachment ends 338a, 338b of the end pieces 338a, 338b are configured to attach to the attachment ends 340a, 340b of the middle piece 330c. Once the shaft pieces 330a-c are attached, the main pole 301 forms a generally arching shape. One of the attachment ends 338a, b and 340a, b can be configured with a post 342 and the complementary attachment end 338a, b and 340a, b can comprise a hole 344 into which the post 342 can be inserted. Other pole attachment mechanisms typically used for tents can also be used.

In some embodiments, the poles 301 can be only two pieces, or even a single pliable piece. In some embodiments, the poles 301 can also be more than three pieces. For example, in the preferred embodiment, the main poles 302, 304, 306, 308 are three rigid pieces, and the auxiliary poles 320, 322 are a single pliable piece. The pliable pieces are still hard, but flexible. As such, the poles can be made from lightweight metals, such as aluminum, or can be made of plastic. Due to the size and/or multiple pieces, the main poles 302, 304, 306, 308 are allowed to remain in their respective sleeves 220a-d even when the tent 10 is in the closed configuration.

By way of example only, the sleeves 220a-d can be arranged on the inner tent 200 so that when the main poles 302, 304, 306, 308 are inserted into their respective sleeves 220a-s, one end pole 306 is angled towards the first side 12 and forms an angle relative to a floor 510 of the base ranging from about 45 degrees to about 75 degrees; preferably from 50 degrees to about 65 degrees, and more preferably about 58 to about 60 degrees. The same angles can be formed with the second end pole 308 angled towards the second side 14. Similarly, one middle pole 302 can be angled towards the first side 12 and form an angle relative to the floor 510 ranging from about 60 degrees to about 90 degrees; preferably 70 degrees to about 85 degrees, and more preferably about 75 degrees to about 84 degrees. The same angles can be formed with the second middle pole 304 angled towards the second side 14. The height of the end poles 306, 308 as measured from the floor 510 of the base 500 to the apex of the pole when assembled and installed can range from about 24 inches to about 36 inches; preferably 27 inches to about 32 inches, and most preferably about 29 inches to about 30 inches. The height of the middle poles 302, 304 as measured from the floor 510 of the base 500 to the apex of the pole when assembled and installed can range from about 35 inches to about 50 inches; preferably about 40 inches to about 48 inches; more preferably about 42 inches to about 44 inches.

The overall length of the main poles 301 (as measured from one end 332 to the opposite end 334) can be adjusted to meet the dimensions above. For example, in the preferred embodiment, the overall length of an end pole 306, 308 can be about 92.5 inches. More specifically, the first and second end pieces 330a-b can be about 25 inches to about 26 inches, and the middle piece 330c can be about 41 inches to about 42 inches, each having prebends 336a-b having a radius of curvature of about 7 inches to about 8 inches. For the main poles, the first and second end pieces 330a-b can be about 35 inches to about 36 inches, and the middle piece 330c can be about 41 inches to about 42 inches, each having prebends 336a-b having a radius of curvature of about 7 inches to about 8 inches.

The auxiliary pole supports 222a-b can be fastened to their respective sleeves 220c-d at a height as measured from the floor 510 of the base 500 ranging from about 20 inches to about 30 inches; preferably from about 22 inches to about 28 inches, and more preferably about 24 inches to about 25 inches. The auxiliary poles 320 can have an overall length (measured from one end to the opposite end) of about 40 inches to about 50 inches, preferably 42 inches to about 48 inches; more preferably about 45 inches to about 46 inches. Installed, the hoop pole 320 can have a height (as measured from the ends of the pole to the apex of the arch) ranging from about 10 inches to about 20 inches, preferably 12 inches to about 18 inches, and more preferably about 14 inches to about 16 inches.

Figure 7A:
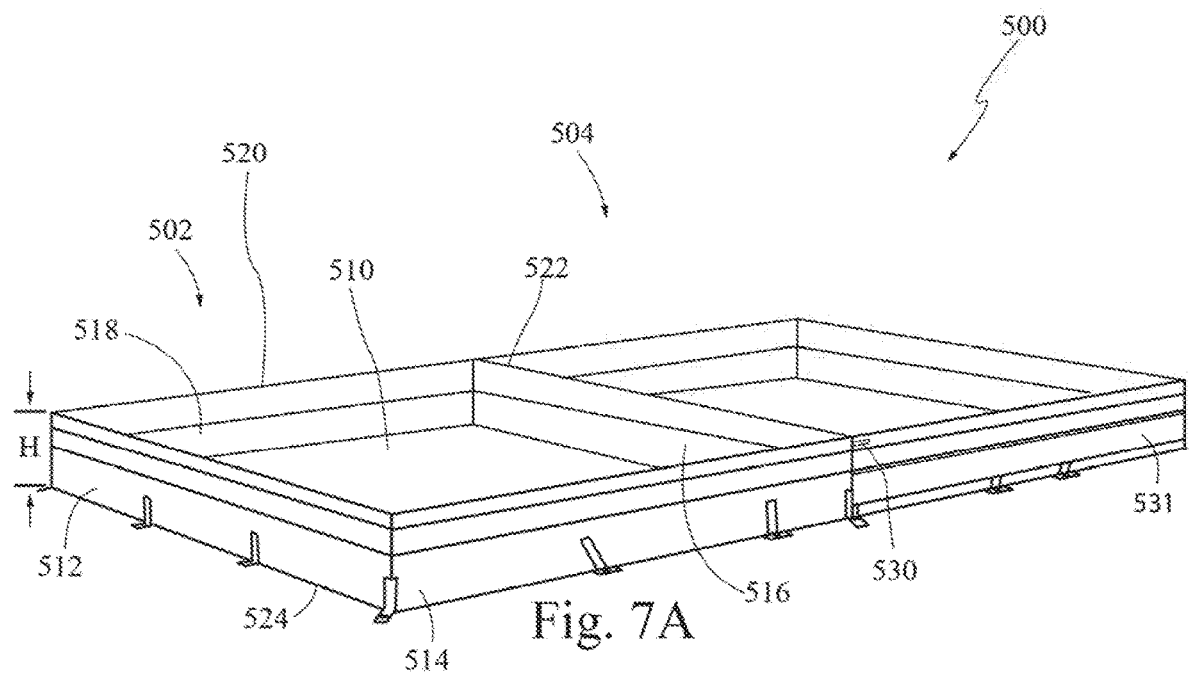
FIG. 7A shows a perspective view of the base in an open configuration.
Figure 7B:
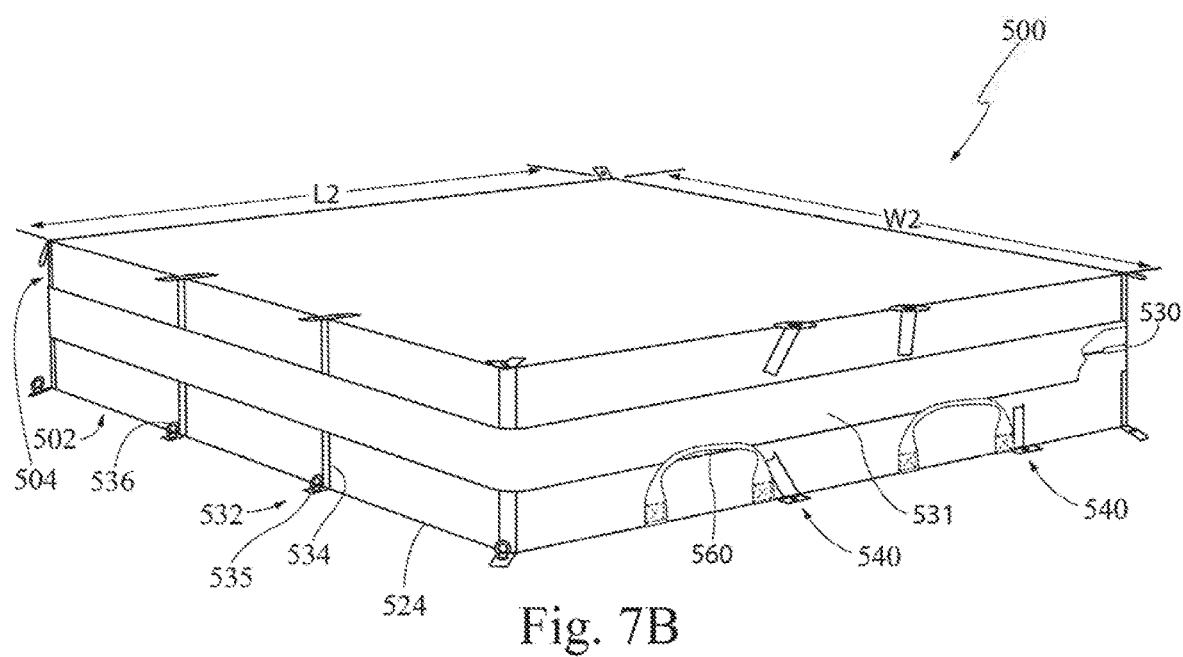
FIG. 7B shows a perspective view of the base in a closed configuration.
Figure 7C:
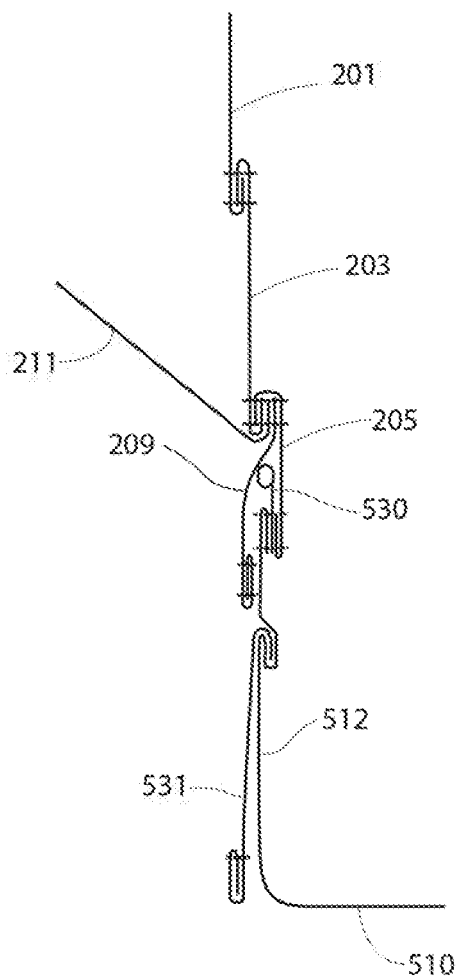
FIG. 7C shows a cross-sectional view of a portion of the base and the tent.

With reference to FIGS. 7A-7C, the base 500 provides the foundation for supporting the main poles 302, 304, 306, 308, as well as containing the cushion 400. Furthermore, the base 500 functions as a storage container for the tent 10 to facilitate storage and transport of the tent 10. In the preferred embodiment, the base 500 can be made of heavy fabric material with a rubberized lining. In some embodiments, the base 500 can be made of rigid, durable material such as plastic, wood, metal, and the like, or any combination thereof. Preferably, the material used to make the base 500 is water and UV resistant.

In the preferred embodiment, the base 500 comprises a first shell 502, and a second shell 504. Each shell 502, 504 is configured in the shape of an open box. As such, each shell 502, 504 comprises a floor 510, and four sidewalls 512, 514, 516, 518. The four sidewalls 512, 514, 516, 518 define a rectangular top edge 520, thereby defining the opening of the open box. In an open configuration, the first shell 502 is placed adjacent to the second shell 504 such than one sidewall 516 from each shell is placed adjacent to each other to form a medial wall at the center of the base 500. The remaining sidewalls 512, 514, 518 of each shell 502, 504 form a perimeter wall defining the outer boundaries of the base 500. The tent edge 204 can be connected to the top edge 520 of the base 500 along the perimeter wall.

In the preferred embodiment, the first shell 502 is connected to the second shell 504 by a hinge 522 along the medial sidewalls 516 such that the first shell 502 and the second shell 504 are movable relative to each other to move between an open configuration in which the first shell 502 and the second shell 504 are laterally adjacent to each other, and a closed configuration in which the first shell 502 and the second shell 504 are vertically adjacent to each other. In other words, in the open configuration, the floors 510 of each shell 502, 504 are laterally adjacent to each other and an extension of each other, and in the closed configuration, the top edges 520 are placed on top of each other with the floors 510 opposite each other like a closed clamshell. In the closed configuration, the rainfly 100, inner tent 200, framework 300, and cushions 400 are housed completely inside the base 500. In the preferred embodiment, the plurality of main poles 302, 304, 306, 308 remain inside their respective sleeves 220a-d when the base 500 is in the closed configuration. In the preferred embodiment, the hinge 522 is a living hinge. For example, each shell 502, 504 can be covered by a covering, such as a fabric. The hinge may simply be the fabric connected together along the medial sidewall 516. Hinge hardware can also be used.

The base 500 further comprises a base fastener 530 to fasten the first shell 502 to the second shell 504 in the closed configuration. Preferably, the base fastener 530 is a zipper, but any other fastening mechanism can be used, such as hook-and-loop fasteners, buttons, hooks, clips, magnets, and the like, or any combination thereof. The base 500 can further comprise a base fastener flap 531 to cover the base fastener 530 in the closed configuration. In FIG. 7A, the base fastener flap 531 is shown flipped in the "wrong" way so as to expose the base fastener 530. In FIG. 7B, the base fastener flap 531 has been flipped into the correct way so as to hide the base fastener 530; however, a portion of the base fastener flap 531 has been removed to reveal the fastener 530 underneath.

Adjacent to the floor 510 of the base 500 along the perimeter corner edges 524 are a plurality of base anchors 532. The base anchors 532 are configured to secure the base 500 to various roof racks of automobiles, and in particular, sport utility vehicles and minivans, or directly to the roof of a vehicle. Eye nuts 536 can be used to secure the base anchors 532. The eye nut 536 can be fastened to the roof rack. The base anchors 532 can also be secured directly to a vehicle roof using straps, ropes, cables, bands, chains, cords, and the like, or any combination thereof. The base anchors 532 can be intermittently spaced apart along the perimeter edge 524 and the corners of at least one of the bases 502, 504 to maximize the ability of the base 500 to be attached to a variety of different automobiles.

Because the tent 10 is configured to be attached to the vehicle in the closed configuration, only one of the shell 502, 504 requires the base anchors 532; however, both shells 502, 504 can have base anchors 532 so as to allow either shell 502, 504 to be attached to the vehicle. In addition, should the user choose to deploy the tent 10 on the ground instead of on the automobile, the base anchors 532 can be used to drive stakes into the ground through the base anchors 532 to secure the base 500 to the ground. The base anchors 532 can be in the form of tabs having an attachment end 534 and a free end 535. The attachment end 534 is attached to the base 500 and the free end 535 hangs freely from the attachment end 534. The free end 535 can define a hole reinforced with a grommet. For example, the base anchor 532 can be in the form of an L-shaped tab with a vertical portion (attachment end 534) attached to the shell 502, 504 and the horizontal portion (free end 535) hanging freely as shown in FIG. 7B. The grommet can be applied to the horizontal portion.

Figure 8:
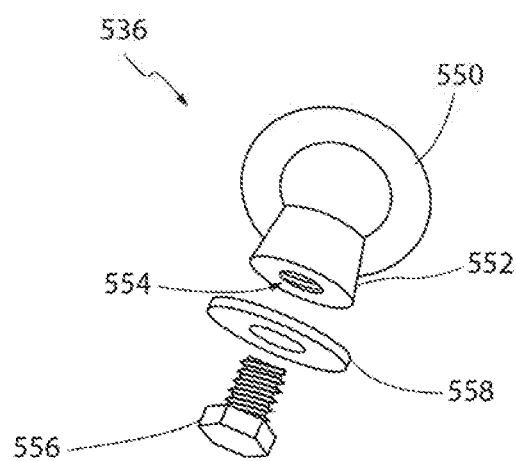
FIG. 8 is a perspective view of an eye nut.

With reference to FIG. 8, the eye nut 536 can be a metal ring 550 with a base portion 552, the base portion 552 having a hole 554 therethrough. The hole 554 can be threaded and configured to receive a bolt 556. A washer 558 can be used to distribute the load applied by the bolt 556.

The base 500 can further comprise pole anchors 540. Pole anchors 540 are configured to receive the terminal ends 332, 334 of the main poles 302, 304, 306, 308 to provide a rigid framework 300 for the tent 10. Once the poles are assembled together and the terminal ends 332, 334 inserted into the pole anchors 540, the tent 10 is erected. The pole anchors 540 can be the same as the base anchors 532, specifically, tabs with a grommet attached thereto to receive pegs 333, 335 at the ends 332, 334 of the poles 301. As such, the pole anchors 540 can be used to anchor the base 500 to the vehicle or the ground, and the base anchors 532 can be used to support the poles 301. The pole anchors 540 are strategically placed along the base 500 to provide proper structure and shape for the tent 10.

By way of example only, the pole anchors 540 can be bilaterally arranged on the base 500 along the front side 16 and back side 18 at about 15.5 inches, 31.5 inches, 55.5 inches, and 63.5 inches from the first side 12. Having the pole anchors 540 spread apart keeps the poles 301 apart rather than joined at a central location, which can reduce the number of options for placement of the door.

The base 500 can further comprise handles 560. One or more handles 560 can be attached to the base along the one or more of the sidewalls 512, 514, 516, 518 or the floor 510. The handles 560 can be used to carry or adjust the base 500 in place.

The tent 10 is efficiently deployed (pitched) and stowed due to the inner tent 100 being attached to the base 500. FIG. 7C shows a close-up of a cross-section through one of the shells 502, 504 of the base 500 in the open configuration with the rainfly 100 removed and a majority of the tent upper body 201 removed. As shown, the inner tent 200 can have a tent upper body 201 attached to the tent lower body 203, which is attached to the base 500. A tent fastener flap 209 attached to the tent lower body 203 is used to cover the base fastener 530 when the base is in the open configuration. A base fastener flap 531 is shown descending downwardly towards the floor 510 of the base 500 in the open configuration. When in the closed configuration, the base fastener flap 531 is folded in the opposite direction towards the edge 520 of the base 500 to cover the base fastener 530 when the base 500 is in the closed configuration.

The base 500 is configured to fit on the roof rack of a vehicle, or in the bed of standard trucks. As such, in the preferred embodiment and by way of example only, in the open configuration (that is, with the two shells 502, 504 laterally adjacent to each other when placed on the roof rack or in the truck bed), the base 500 can have a length L1 of about 90 inches or less. In some embodiments, the length L1 of the base 500 is about 79 inches to about 85 inches. In some embodiments, the length L1 can be 79 inches or less. The width W1 of the base 500 can be about 58 inches or less. In some embodiments the width W1 is about 36 inches to about 50 inches. In some embodiments, the width W1 can be about 38 inches to about 49 inches.

Figure 9:
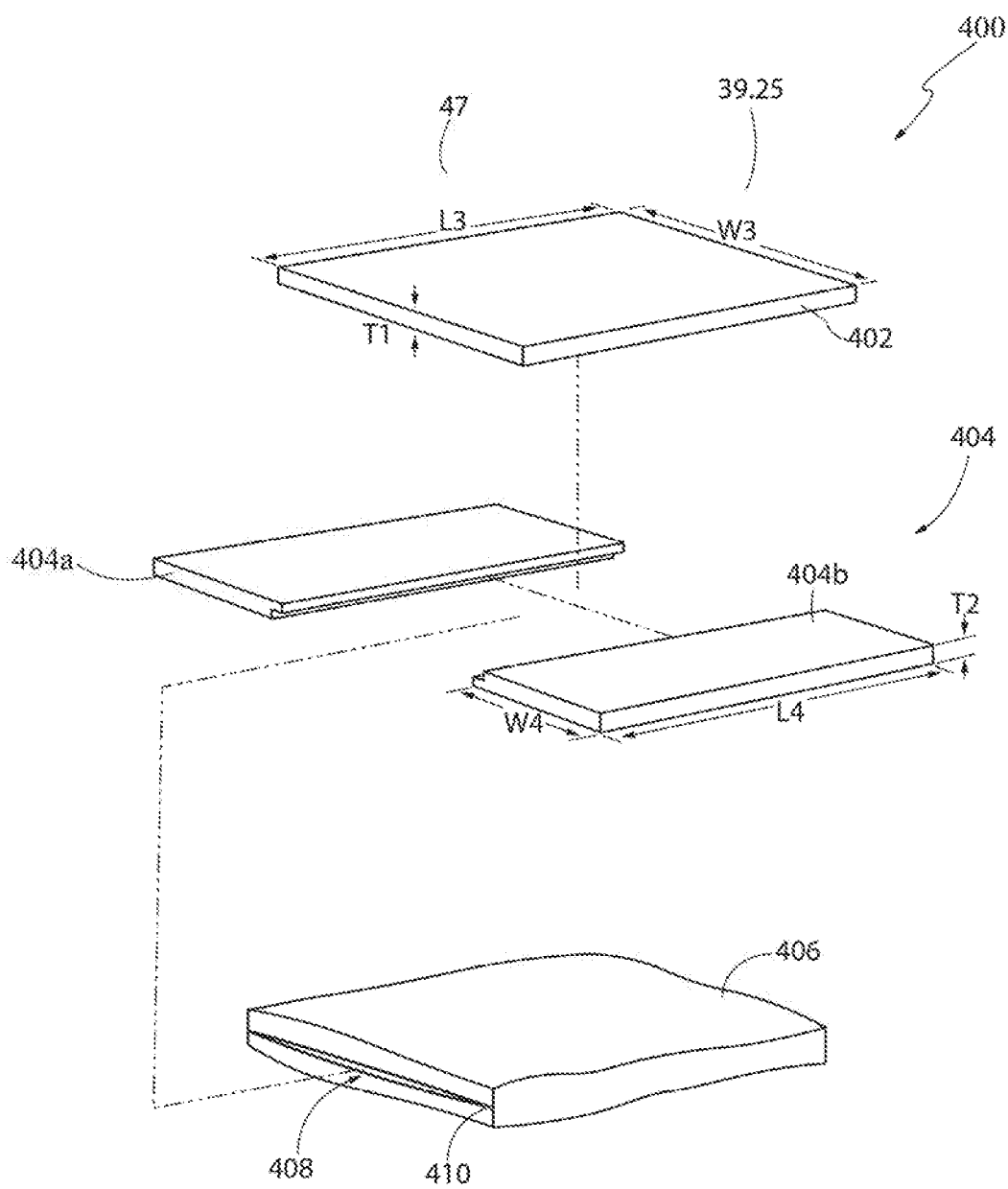
FIG. 9 is an exploded view of a cushion on one side.
Figure 10:
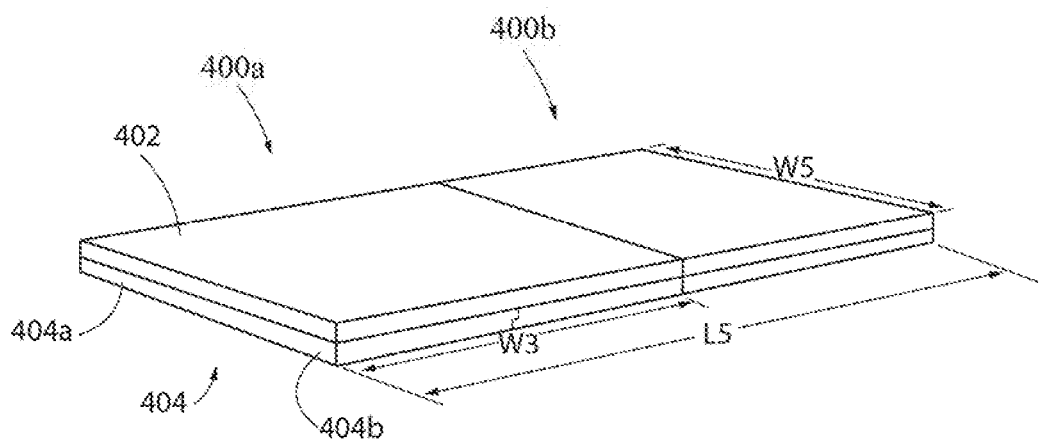
FIG. 10 is a perspective view of the cushion assembled.
Figure 11:
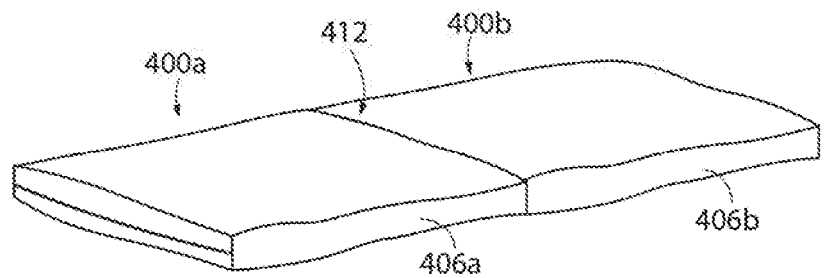
FIG. 11 shows the cushions placed inside cushion covers.

With reference to FIGS. 9 and 10, the tent 10 further comprises cushions 400. The cushion 400 provides the comfortable bed upon which the user sleeps. As such, the cushion 400 can be a large piece of cushion material configured to fit inside one of the shells 502, 504. As such, in the preferred embodiment, the tent 10 comprises two cushions 400 that are essentially the same. A single cushion 400 is described herein, which applies to both cushions.

Each shell 502, 504 can have its own cushion 400. The cushion 400 can be a single piece. In the preferred embodiment, however, to facilitate storage and transport, the cushion 400 comprises two layers, an upper layer 402 and a lower layer 404. The upper layer 402 is the layer upon which the user can sleep directly, and comprises soft foam. For example, the upper layer 402 can comprise open cell polyurethane foam. Preferably, the upper layer 402 is preferably a single piece. The length L3 and width W3 of the upper layer 402 is substantially similar to the length L2 and width W2 of one of the shells 502, 504 so as to fit inside the shell 502, 504. In addition, due to the lower layer 404, the upper layer can have a thickness T1 that is approximately half the height H of the sidewalls 302, 304, 306, 308 of the shell 502, 504. Therefore, in the preferred embodiment, when the upper layer 402 is stacked on top of the lower layer 404, the combined thickness of the upper layer 402 and the lower layer 404 is approximately the same as the height H of one of the sidewalls 302, 304, 306, 308 of the shells 502, 504.

Figure 12:
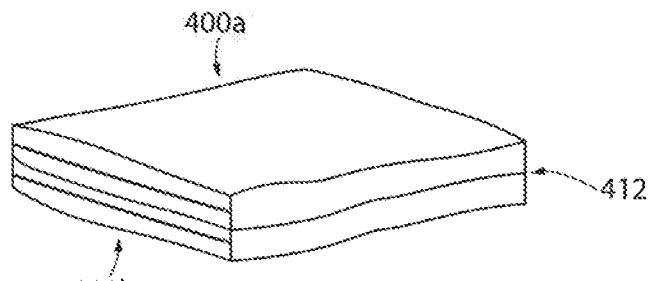
FIG. 12 shows the cushions folded for storage or transportation.
Figure 13:
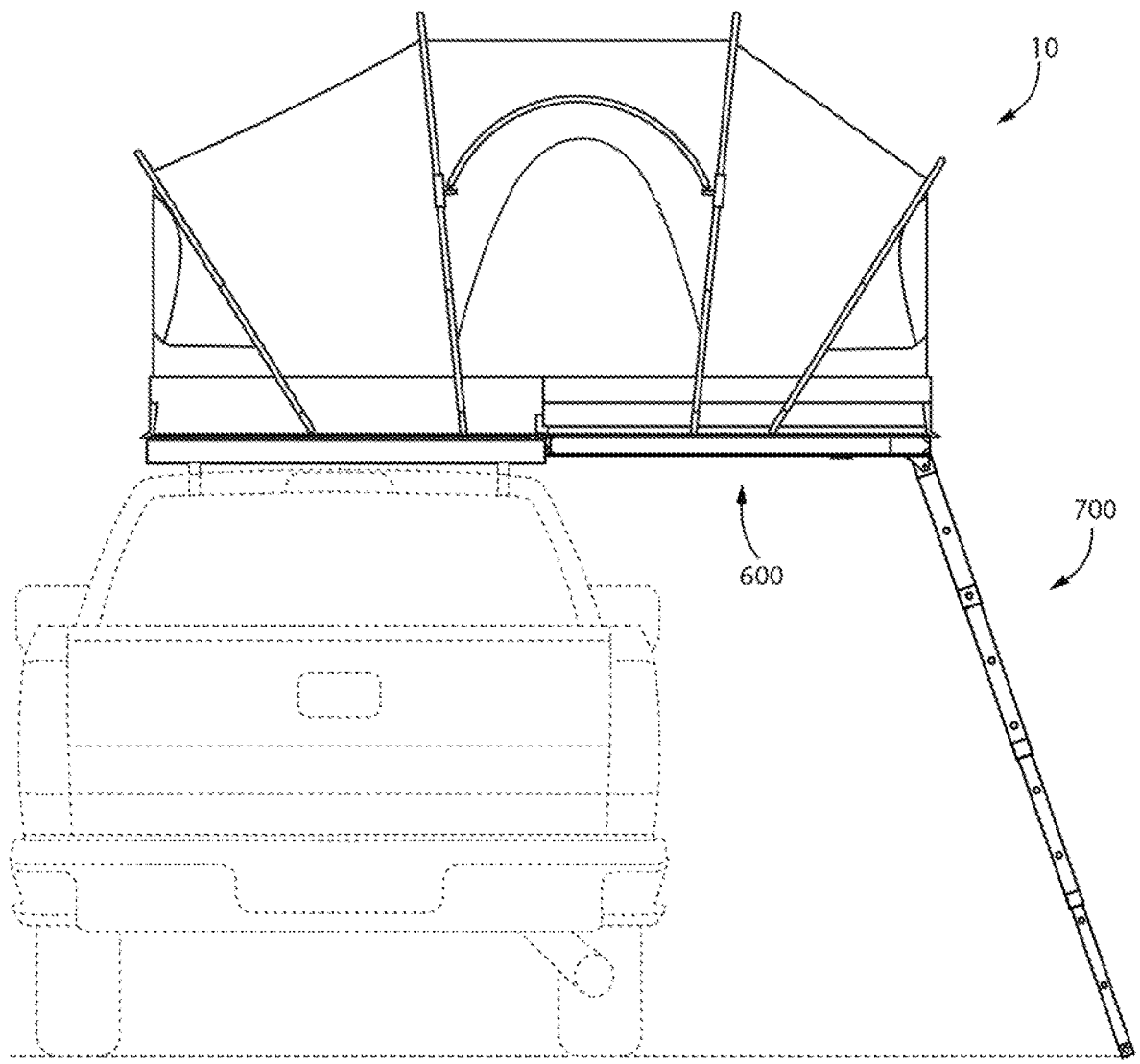
FIG. 13 shows a versatile tent mounted on a vehicle with a platform.

In some embodiments, the cushions 400 can be housed inside respective cushion coverings 406. Each cushion covering 406 can have an opening 408 through which the cushions 400 can be inserted. The opening 408 can be closed with a fastener 410, such as zippers, hook-and-loop fasteners, buttons, clips, magnets, and the like. Preferably, two cushion coverings 406a, 406b can be connected at a top medial edge 412. This connection along the top medial edge 412 creates a gap in between the two cushions 400a, 400b to allow the medial wall 516 to be inserted when the cushions 400a, 400b are inserted into the base 500. In addition, the connection at the top medial edge 412 also allows one cushion 400a to be folded on top of the other cushion 400b for storage as shown in FIG. 12.

The lower layer 404 is the support layer and is generally harder and denser than the upper layer 402. As such, the lower layer 404 can comprise closed cell foam. For example, the lower layer 404 can be high density polyurethane foam. Preferably, the lower layer 404 is comprised of two generally equal pieces 404a, 404b assembled together, for example, via a rabbet joint. Any other joint type can be used to connect the two lower layer pieces 404a, 404b. The thickness T2 of the lower layer 404 is approximately half the height H of the sidewalls 302, 304, 306, 308 of one of the shells 502, 504.

By way of example only, each upper layer 402 can have a width W3 of about 39.25 inches, a length L3 of about 47 inches, and a thickness T1 of about 2 inches. Each lower layer piece 404a, 404b can have a width W3 of about 19 inches, a length L4 of about 46.5 inches, and a thickness of about 1.5 inches to about 2 inches. When assembled together, the two lower layer pieces 404a, 404b substantially match the length and width dimensions of the upper layer 402.

A user may receive the tent 10 in the closed configuration with the rainfly 100, inner tent 200, and framework 300 inside the base 500. Optional accessories include, but are not limited to, cables, ropes, stakes, ladders, tent platforms, and the like. The framework 300 can be disassembled, but the main poles 302, 304, 306, 308 remain in their respective sleeves 220a-d. In order to pitch the tent 10, the user opens the base 500 to reveal the rainfly 100, inner tent 200, and framework 300. For each main pole 302, 304, 306, 308, the individual pole pieces 336a-c can be connected together while still in their respective sleeves 220a-d. The ends 332, 334 of each main pole 301 are then inserted into their respective pole anchors 540 in the base 500. At this stage, the tent 10 is fully erected and supported. In some embodiments, the cushion 400 may already be installed upon arrival.

In some embodiments, the cushion pieces are shipped separately. Because the upper layer 402 is soft foam, it can be rolled up and shipped. Because the lower layer 404 is hard foam 404, each lower layer 404 can come as two separate pieces 404a, 440b to decrease the shipping size. As such, the tent 10 can be shipped in two packages via ground shipping rather than the more expensive freight shipping. Preferably, the upper layer 402 and cushion cover 406 can be shipped in one package and the lower layer 404, rainfly 100, inner tent 200, framework 300, and base 500 can be shipped in a separate package.

With the base 500 in the open configuration, one lower layer 404 can be placed in each shell 502, 504. Then, one upper layer 402 can be placed on top of each lower layer 404 in each shell 502, 504. Thus, each shell 502, 504 has one complete set of cushions 400. Properly assembled, the lengths L3 of each cushion 400 are placed adjacent to each other. As such, the sum of the two widths W3 becomes the overall length L5 of the cushion 400 at about 79 inches long. The sum of the original lengths L3 of each cushion 400a, 400b now becomes the overall width W5 of the cushion 400 at about 47 inches. These dimensions are substantially similar to the dimensions of the base 500, which, in the open configuration, is about 47 inches wide and about 79 inches long. The foam pieces can be placed in a fabric cushion cover 406, then the entire mattress can be inserted in to the base 500 of the tent 10.

To disassemble the tent 10, the cushions 400 are left inside their respective shells 502, 504. The main poles 302, 304, 306, 308 are removed from their respective pole anchors 540. The main poles 302, 304, 306, 308 can be disassembled into their individual pieces 330a-c; however, they are left inside their respective sleeves 220a-d. One of the shells 502, 504 is folded on top of the other shell 504, 502 making sure all components of the tent 10 are tucked inside. The two shells 502, 504 are then secured together with the base fastener 530. The base fastener flap 531 is folded over the base fastener 530 to keep it hidden. The tent 10 in the closed configuration with all components inside the base 500 can be mounted on the user's vehicle for transport. For example, mounting the base 500 on the vehicle can comprise securing the base 500 directly to the roof of the vehicle, to a roof rack, to load bars, inside the bed of a truck, or inside the vehicle itself, and the like.

By way of example only, to attach the tent 10 to the vehicle, the base 500 in the closed configuration is placed directly on the roof of the vehicle and attached by straps, cables, cords, and the like, or attached indirectly to the vehicle using roof racks or load bars. The eye nuts 536 are used to fasten the base anchor 532 to the various T-slot configurations of popular roof rack brands, for example, from Front Runner, Yakima, and Rhino. The entire tent 100 can weigh approximately 50 pounds or less. Preferably, the tent 10 weighs approximately 40 pounds or less. More preferably, the tent 10 weighs approximately 30 pounds or less. As such, placing the tent 10 on top of the vehicle and securing the tent 10 to the vehicle can be accomplished by one person.

Once the user arrives at the destination, the user can choose to pitch the tent 10 on the roof rack, place the tent 10 in the bed of the truck, or place the tent 10 on the ground. If deployed on the roof rack, the user simply unzips the base 500 and opens the base 500. The second shell 504 can be fastened to the roof rack as described above. The tent 10 can then be erected as described above. If pitching the tent 10 in the bed of a truck or on the ground, the user simply removes the tent 10 from the roof rack and pitches the tent 10 where desired as discussed above. If the user pitches the tent 10 on the roof rack of a vehicle, and the user wants to drive around the site or elsewhere, the tent 10 can either be removed from the roof rack by releasing the eye nut 536, or simply closing the tent 10 back up.

No claim is made to the sequence of steps unless specifically stated. For example, the base 500 can be connected to the roof rack prior to opening the base 500; half the base 500 can be connected to the roof rack then the base opened and the frames set up, and the rest of the base connected to the roof rack; the entire base 500 can be connected to the roof rack then the frames set up; the entire tent can be set up on the ground or in the bed of the truck, then placed back on the roof rack and secured; and the like. Therefore, there are many different sequences for performing the steps of pitching the tent.

With reference to FIGS. 13-16, in some embodiments, the versatile tent 10 may further comprise a platform 600. The platform 600 allows the tent 10 to be mounted in the open configuration on the vehicle even if the tent 10, in the open configuration, has dimensions that are greater than the dimensions of the roof the vehicle, or that of a compatible roof rack or load bars; or if the tent 10 is arranged to hang of the roof or the bed of the vehicle. The platform 600 also facilitates secure mounting of the tent 10 on the roof of a vehicle that only has load bars or roof racks. As such, the platform 600 can be mounted on the vehicle via the roof, roof racks, load bars, bed of a truck, and the like. For example, with reference to FIG. 13, the tent 10 is arranged transversely with the roof of the vehicle so that the approximately half the base 500 overhangs off the roof. The platform 600, therefore, supports the portion of the base 500 hanging off the roof of the vehicle. Alternatively, the platform 600 can be used on the ground as well to elevate the tent 10 off the ground.

The platform 600 is generally rectangular in shape having a first end 610, a second end 612 opposite the first end 610, a first side 614 adjacent to the first end 610 and the second end 612, and a second side 616 opposite the first side 614, and adjacent to the first end 610 and the second end 612. Preferably, the platform 600 can be comprised of two panels 602, 604 connected together with a hinge 606. As such, each panel comprises a medial side 618a, 618b that can be connected together with the hinge 606 at a middle 620 of the platform 600. The panels 602, 604 can be made from rigid material, Styrofoam® material surrounded by steel framing 608. Preferably, the exposed corners are covered with plastic corner pieces 622. Other rigid materials that can be used to make the panels 602, 604 include wood, plastic, metal, and the like, and any combination thereof.

Figure 14:
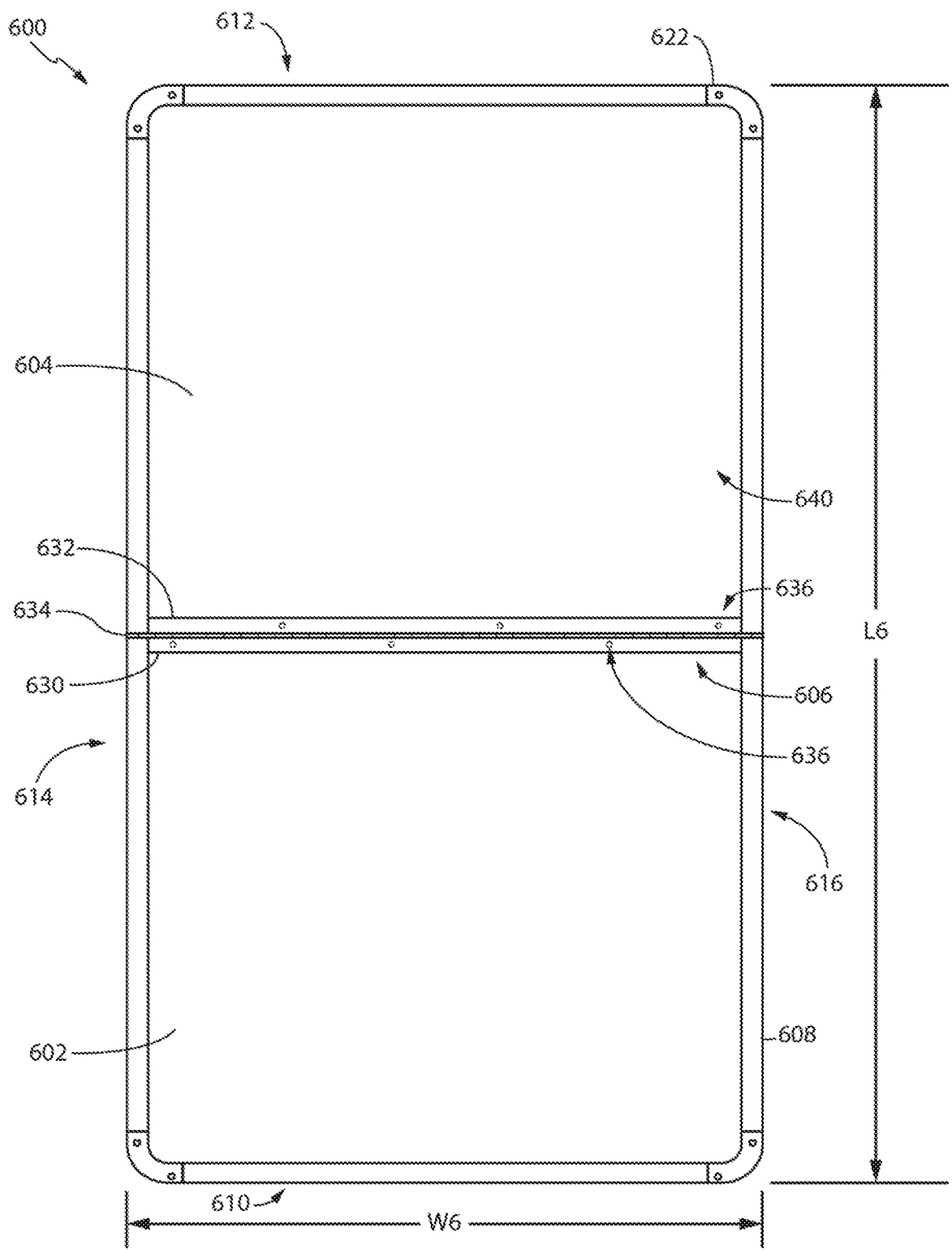
FIG. 14 shows a top plan view of an embodiment of the platform.
Figure 15:
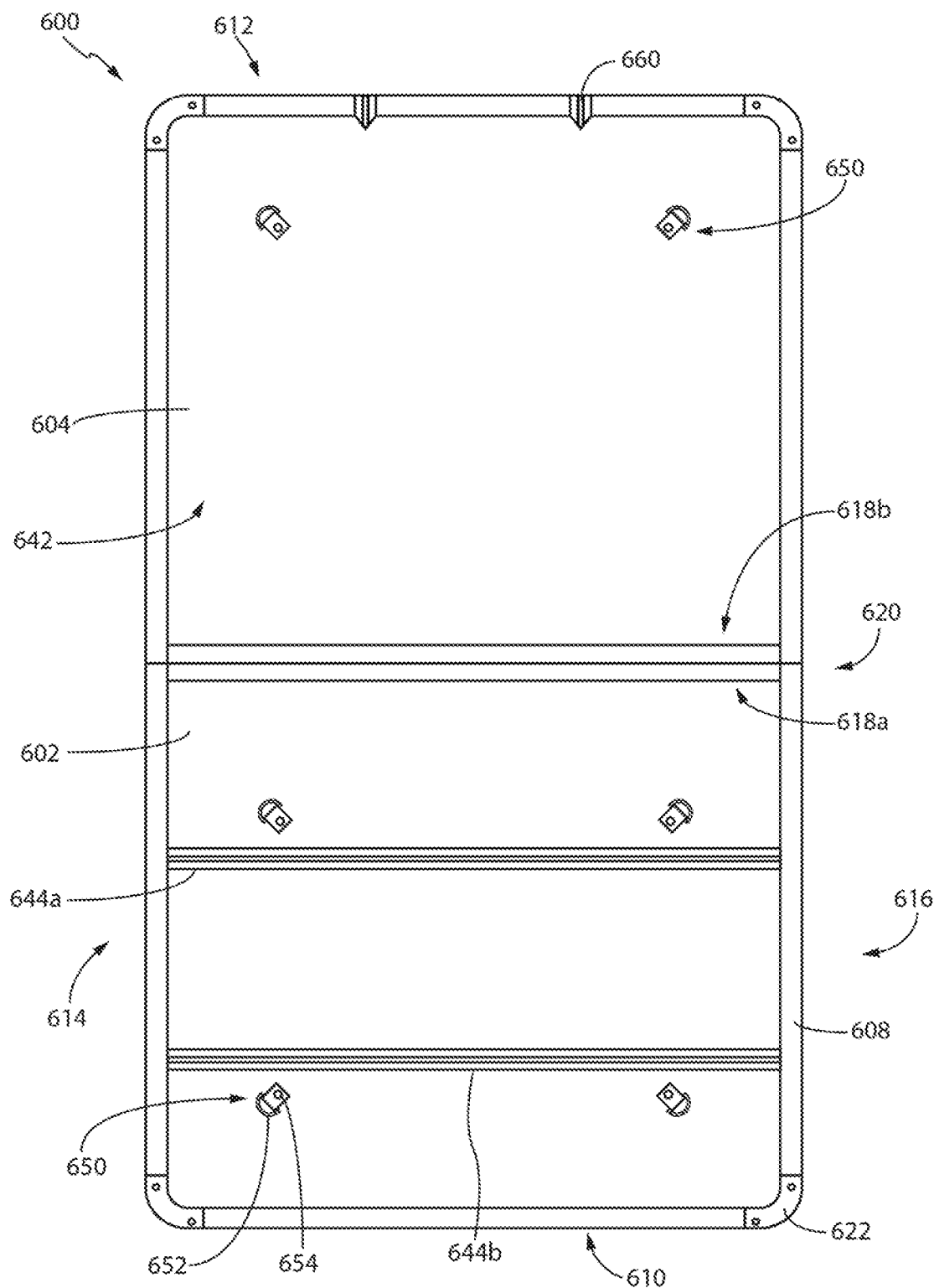
FIG. 15 shows a bottom plan view of an embodiment of the platform.

With reference to FIG. 14, the hinge 606 allows the two panels 602, 604 to fold on top of each other for storage and transportation. The hinge 606 can be a continuous hinge (piano hinge) that extends substantially from one side 614 of the platform 600 to the opposite side 616. In some embodiments, a plurality of hinges 606 can be used. The hinge 606 comprises a pair of opposing leaves 630, 632 connected together at a knuckle 634. Each leaf 630, 632 defines a plurality of holes 636 to fasten the leaves 630, 632 to their respective panel 602, 604. Preferably, the hinge 606 is fasten to its respective panel using button head bolts to create a smooth surface. Preferably, all components of the platform 600 are connected to the panels 602, 604 with button head bolts. Typically, the holes 636 on opposing leaves 630, 632 are paired so as to align with each other. In the preferred embodiment, the holes 636 on one leaf 630, are offset from the holes 636 on the opposite leaf 632. Having the holes 636 offset allows the platform 600 to fold flat.

The platform 600 defines a top side 640 and a bottom side 642. The top side 640 is generally flat and is the side that receives the tent 10. The hinge 606 is preferably mounted on the top side 640. As such, when the platform 600 is folded, the top sides 640 of each panel 602, 604 are positioned adjacent to and facing each other as shown in FIG. 16. To create a tight connection between the two panels 602, 604 when in the open configuration, one of the medial sides 618a, 618b can have a recess 637, and the other medial side 618a, 618b can have a locating protrusion configured to fit inside the recess 637 when the platform is in the open configuration to assure that the panels 602, 604 are opened completely and aligned properly. For example, the recess 637 can be a hole, a plurality of holes, channels, and the like. The locating protrusion 638 can be a locating peg, or projecting rod, and the like.

The bottom side 642 is configured to mount on the vehicle, either directly to the roof of the vehicle, or indirectly via roof racks, load bars, and the like, or to the bed of a truck. As such, in the preferred embodiment, the bottom side 642 of at least one of the panels 602, 604 can comprise a support mount. The support mount can be a rail, a track, a bar, a bracket, a clamp, a hook, and the like, or any combination thereof, which allows the panel to attach to the vehicle, directly or indirectly. By way of example only, with reference to FIG. 15, a pair of support mounts 644a, 644b can extend from one side 614 of the platform 600 to the opposite side 616 as a rail or track, parallel to the hinge 606. The support mounts 644a, 644b can receive a bracket that can be fastened to, for example, a roof rack. The bracket can be slidably mounted on the rail or track so as to slide longitudinally anywhere along the rail or track with minimal transverse or vertical movement relative to the rail or track. The bracket can be slid along the track until it is properly aligned with the roof rack where it can be fastened to the roof rack. Fastening the bracket to the roof rack tightens the bracket against the rail or track, thereby preventing any further movement of the bracket.

The platform 600 can further comprise tent connectors 650. Tent connectors 650 can be used to secure the tent 10 to the platform 600. For example, the tent connector 650 can comprise a ring 652 (such as an D-ring) attached to the platform 600 by a strap 654. The strap 654 can be attached to the platform 600 with button head bolts. Preferably, the tent connector 650 is on the bottom side 642 of the platform 600. A variety of different types of fastening mechanisms can be used to secure the tent 10 to the tent connectors. For example, hooks, clips, straps, bands, cables, and the like can be used to fasten the tent 10 to the platform 600 via the tent connectors. Attaching the tent 10 to the platform via tent connectors 650 eliminates the need for the tent poles to be inserted into the platform 600. The base anchors 532 on the base 500 of the tent 10 can be attached to the tent connectors 650 using straps, cables, chords, and the like to secure the base 500 of the tent 10 to the platform 600. Preferably, the base anchors 532 at the corners of the base 500 are used to secure the base to the platform 600. As such, the tent connectors 650 can be positioned near the corners of the platform 600.

The platform 600 can further comprise a ladder support 660 to allow a ladder 700 to be attached to the platform 600. Preferably, the ladder support 660 can be positioned at one of the ends 610, 612 or sides 614, 616 of the platform 600. The ladder support 660 can be a bracket to which the ladder 700 is securely attached. In some embodiments, with the ladder 700 attached, the ladder 700 can provide support to the panel 604 that hangs off the vehicle, while the vehicle provides the support for the other panel 602. The ladder 700 can be a folding ladder or a telescoping ladder so that the ladder can be reduced in size for transportation and storage.

During transportation, the platform 600 is in the folded configuration and attached to the vehicle directly or indirectly, and the base 500, in the closed configuration with tent 10 components inside, is attached to the platform 600.

By way of example only, the platform 600 can be made of two equally sized panels 602, 604 connected together to create a platform 600 having a length L6 of approximately 79 inches. The width W6 of the platform 600 is preferably 47 inches. Preferably, the length L6 and the width W6 of the platform 600 is substantially the same as the length L1 and width W1 of the base 500 of the tent 10 as disclosed herein. Therefore, the length L6 of the platform 600 in the open configuration can be about 90 inches or less. In some embodiments, the length L6 of the platform 600 can be about 79 inches to about 85 inches. In some embodiments, the length L6 of the platform 600 can be 79 inches or less. The width W6 of the platform 600 can be about 58 inches or less. In some embodiments, the width W6 of the platform 600 can be about 36 inches to about 50 inches. In some embodiments, the width W6 of the platform 600 can be about 38 inches to about 49 inches. A pair of support mounts 644a, 644b can be fastened to a first panel 602 parallel to each other, with a first support mount 644a positioned approximately 11.5 inches from the medial side 618b and a second support mount 644b positioned approximately 11.5 inches from the first end 610. The tent connectors 650 can be connected to the platform 600 near the four corners of the platform 600 at approximately 9.5 inches inward from the first end 610 and first side 614, first send 610 and second side 616, second end 612 and first side 614, and second end 612 and second side 616. Fifth and sixth tent connectors 650 can be positioned approximately 9.5 inches from the medial side 618a and the first side 614, and approximately 9.5 inches from the medial side 618a and the second side 616.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

INDUSTRIAL APPLICABILITY

This invention may be industrially applied to the development, manufacture, and use of a versatile tent with bed that can be mounted on the roof of a vehicle, in the flat bed of a truck, on a trailer, or on the ground. The base of the tent is formed of heavy fabric with a rubberized lining that is water proof that can be used to house the cushions, the framework, the inner tent, and the rainfly.

What is claimed is:

1. A tent comprising:
a base comprising a fabric material having a rubberized lining, wherein the base is formed as at least one open box comprising a perimeter wall and an exterior edge of the base that comprises (a) a plurality of pole anchors and (b) a plurality of base anchors configured to secure the base to a roof rack or roof of a vehicle;
an inner tent having a tent edge, the tent edge connected to the perimeter wall;
a framework for supporting the inner tent and comprising terminal ends configured to be inserted into respective pole anchors of the plurality of pole anchors; and
at least one cushion configured to fit within the at least one open box,
wherein (a) the base is formed as a first shell and a second shell, each of the first shell and the second shell formed as a respective open box, (b) the first shell and the second shell are movable relative to each other to move between an open configuration in which the first shell and the second shell are laterally adjacent to each other, and a closed configuration in which the first shell and the second shell form a closed box enclosing the inner tent, the framework, and the at least one cushion.

2. The tent of claim 1, wherein (a) the framework comprises a plurality of main poles for supporting the inner tent, each respective main pole comprising a shaft extending between respective terminal ends of the respective main pole and (b) the inner tent comprises a plurality of sleeves each configured to receive a shaft of a respective main pole therethrough when the base is in the open configuration and when the base is in the closed configuration.

3. The tent of claim 1, wherein the at least one cushion comprises two cushions, each of the two cushions configured to fit within a respective one of the first shell or the second shell.

4. The tent of claim 3, wherein each of the two cushions comprises a lower layer and an upper layer, the lower layer being a support layer and the upper layer being softer than the lower layer.

5. The tent of claim 4, wherein the upper layer comprises open cell foam and the lower layer comprises closed cell foam.

6. The tent of claim 5, wherein the lower layer comprises two pieces configured to mate together to form the lower layer.

7. The tent of claim 3, wherein each of the two cushions are housed inside a respective cushion covering of two cushion coverings, the two cushion coverings connected to one another at respective top medial edges thereof.

8. The tent of claim 1, wherein the inner tent further comprises a tent edge tab extending from the tent edge and configured to be connected to adjacent corners of the base where the first shell and the second shell meet.

9. The tent of claim 1, wherein the inner tent comprises a tent upper body and a tent lower body, the tent lower body defining the tent edge and configured to be more water resistant than the tent upper body.

10. The tent of claim 9, wherein the tent lower body comprises one or more tent fastener flaps each configured to cover a respective fastener used to connect the first shell to the second shell when the base is in the closed configuration.

11. The tent of claim 1, wherein the tent in the closed configuration weighs 50 pounds or less.

12. The tent of claim 1, further comprising a rainfly, wherein the rainfly is attached to the inner tent.

13. The tent of claim 12, wherein the rainfly is permanently attached to the inner tent via one or more rainfly fastening edges of the rainfly.

14. The tent of claim 13, wherein the inner tent comprises one or more inner tent fastening edges, a respective rainfly fastening edge of the one or more rainfly fastening edges being attached to an inner tent fastening edge of the one or more inner tent fastening edges.

15. The tent of claim 12, wherein the framework comprises hoop poles to reconfigure a shape of the rainfly.

16. The tent of claim 1, further comprising one or more eye nuts, each eye nut comprising a respective ring and a respective base portion, the respective base portion having a threaded hole, wherein the one or more eye nuts are configured to secure the tent to a structure via the plurality of base anchors.

17. The tent of claim 1, further comprising a platform comprising a first panel and a second panel connected to the first panel by a hinge, the first panel comprising a support mount and a ladder support.

18. The tent of claim 17, wherein a medial side of one of the first panel or the second panel comprises a recess and a medial side of another of the first panel or the second panel comprises a locating protrusion configured to fit inside the recess when the platform is in the open configuration.

19. A tent comprising:
a base comprising a fabric material having a rubberized lining, wherein the base is formed as at least one open box comprising a perimeter wall and an exterior edge of the base that comprises (a) a plurality of pole anchors and (b) a plurality of base anchors configured to secure the base to a roof rack or roof of a vehicle;
an inner tent having a tent edge, the tent edge connected to the perimeter wall;
a framework for supporting the inner tent and comprising terminal ends configured to be inserted into respective pole anchors of the plurality of pole anchors;
at least one cushion configured to fit within the at least one open box; and
a platform comprising a first panel and a second panel connected to the first panel by a hinge, the first panel comprising a support mount and a ladder support.

20. A tent comprising:
a base comprising a fabric material having a rubberized lining, wherein the base is formed as at least one open box comprising a perimeter wall and an exterior edge of the base that comprises (a) a plurality of pole anchors and (b) a plurality of base anchors configured to secure the base to a roof rack or roof of a vehicle;
an inner tent having a tent edge, the tent edge connected to the perimeter wall;
a framework for supporting the inner tent and comprising terminal ends configured to be inserted into respective pole anchors of the plurality of pole anchors;
at least one cushion configured to fit within the at least one open box; and
a rainfly, wherein the rainfly is attached to the inner tent.

* * * * *